3,328,322
PROCESS OF MAKING THERMOSETTING MOLD-
ING COMPOSITIONS CONTAINING ALKALI-
EXTRACTED TREE BARK FIBER
Roland E. Kreibich, Seattle, and William C. Grendon,
Longview, Wash., Douglas M. Roe, Basking Ridge, N.J.,
Richard E. Ortengren, Mount Clemens, Mich., and
Keith D. Gehr, Longview, Wash., assignors to Weyer-
haeuser Company, Tacoma, Wash., a corporation of
Washington
No Drawing. Continuation of application Ser. No.
428,844, Jan. 28, 1965. This application July 18,
1966, Ser. No. 566,083
3 Claims. (Cl. 260—17.2)

This is a continuation of application Ser. No. 428,844, filed Jan. 28, 1965 and now abandoned which was a continuation-in-part of application Ser. No. 356,656, filed Apr. 1, 1964, now abandoned.

This invention relates to plastics. It pertains particularly to thermosetting molding compositions comprising a phenol-aldehyde, a melamine-aldehyde, or a urea-aldehyde resin and alkali-extracted Douglas fir bark fiber.

To be suitable for commercial application, a phenolic, urea or melamine molding compound should be characterized by adequate impact strength, good flash release qualities, freedom from staining tendencies and, for efficient handling and hopper feeding, relatively high bulk density. A problem thus is presented since when the molding compound contains the usual finely divided fillers such as wood flour and walnut shell flour, its bulk density and flash release quantities are satisfactory, but its impact strength is too low for many applications.

On the other hand, when the molding compound contains long fibered fillers such as paper flock, cotton flock or sisal fiber, it has adequate impact strength but is deficient in bulk density and flash release. Also, the surface qualities of the molded product are unsatisfactory for many applications because of the presence of a major proportion of long filler fibers.

The present invention is based upon the discovery that alkali-extracted Douglas fir bark fiber, often referred to as bast fiber, overcomes the foregoing difficulty and, when used as a filler component of phenolic molding compounds, provides a compound of adequate impact strength, flash release and bulk density. At the same time, the presence of the bark fiber improves the flow of the compound, imparts good appearance to the molded product and does not stain the mold.

In the native bark, the fibers are inmitately commingled with other constituents. Thus, Douglas fir bark contains from 20–50% by weight, dry bark basis, of bast fibers (sclerenchyma) in intimate admixture with varying proportions of parenchyma and cork.

The bast fibers, termed herein simply "bark fibers," occur in the form of strong, tough, hard needles which generally are spindle shaped (generally cylindrical with tapering ends) and have a length averaging about 1 mm. As found in the bark, they are encrusted with tightly adherent sheaths of parenchyma tissue.

In a typical mechanical procedure for separating the fiber from the other bark constituents the bark is ground or milled at controlled moisture content to a suitable particle size. It is then fractionated mechanically by screening, winnowing, or otherwise into fractions comprising predominately bark fiber, parenchyma and cork.

Such a procedure while producing bark fractions useful for many purposes, still has not been successful in completely freeing the fibers from the encrusting sheaths of parenchyma. In addition, where the mechanical fractionation has been carried out to the degree necessary to secure relatively pure fractions the yields have been quite small. Still further, the fiber fraction contains a high percentage of complex acids and phenolic bodies, i.e., of alkali-soluble materials, which adversely affect the resin properties and create mold-staining problems.

Accordingly, fiber fractions which have been extracted with alkali, or prepared by alkaline extraction of the whole bark are used as essential constituents of the molding compositions of the present invention.

In preparing such factions the raw bark, or a previously separated, fiber-containing fraction of whole bark having a particle size of ¼ inch cube or less, is extracted with an aqueous alkaline treating agent broadly comprising a basic acting compound of an alkali metal or ammonium. caustic soda is a preferred treating agent, although other alkaline agents such as caustic potash, sodium carbonate, borax and ammonium hydroxide also may be used.

The bark is extracted with the aqueous alkaline treating material in either single or multiple stages, either batchwise or continuously, at a pH of from 8–12, at an alkali usage of from 5–25% by weight, and at a consistency of the bark of from 5–40%. The treating time is variable, although in general a period of from 30–180 minutes is adequate.

The foregoing treatment serves several important functions. First, and most significantly for the present purpose, it provides a bark fiber fraction having an alkali soluble content of below 20%, preferably less than 15% by weight, dry basis, whereas the whole bark or fiber-containing fraction thereof, may have an alkali soluble content in the range of 30 to 60%. This result is accompanied by dissolving away a substantial proportion of the bark substance from the individual fibers, leaving them as a solid residue.

After the chemical treatment has been completed, the resulting alkaline slurry is withdrawn from the reactor and separated by screening, or otherwise, into an extract fraction and a residual bark fiber fraction. The latter may be washed with hot water or other solvent to further remove entrained extract. The fiber fraction is then dried after which it is applicable directly in the formulation of the herein described molding compositions.

However, for some molding compound applications, it may be desirable to dry the fiber product to a moisture content or less than 50% by weight and subject it to a screening to remove any wood splinters that may have adhered to the bark upon removal from the log. It may also be desirable, in some instances, to screen the bark fiber product to free it of any alkali-insoluble particles of parenchyma or cork cells remaining as dust. The dried fiber should be adjusted to a pH of less than 7, preferably between 6 and 7, by treatment with any suitable acid when being used with either urea-aldehyde or melamine-aldehyde, or when increased water resistance is desired in any of the resins. All of these resulting products are termed herein "alkali-extracted bark fiber."

The extracted bark fiber product used in the molding compounds of the present invention generally will be of a particle size so as to pass through a 28-mesh screen and be retained on a 200-mesh screen (U.S. Sieve Series) and will have an average length to breadth ratio of about 15:1.

The phenolic resin which is combined with the above described alkali-extracted bark fiber product broadly comprises a one or two-stage thermosetting resinous condensation product of a phenol, such as phenol itself, the cresols, xylenols, cresylic acid or resorcinol or mixtures thereof, and an aldehyde such as formaldehyde, acetaldehyde, furfural and the like. The phenol-formaldehyde resins customarily used as constituents of phenolic molding compositions, and available as a wide variety of commercial preparations, are particularly well suited for the present purpose.

Exemplifying the one-stage resins found suitable for the present invention are those prepared by reacting one mole of phenol with a solution of formaldehyde in the presence of 0.5–2% by weight based on the phenol of a hydroxide catalyst (sodium, calcium, barium, etc.) to yield a ratio of 1.0 to 1.3 moles of formaldehyde to one mole of phenol. The reaction is carried out by heating slowly (30–60 minutes) to a temperature of 70–100° C. and holding at that temperature for another 30–60 minutes to carry out the condensation step. The resin product is recovered by dehydrating while heating under vacuum and then cooling.

Typical of the two-stage resins suitable for use in the present invention are those prepared by placing one mole of phenol into a reactor with 1% by weight concentrated sulfuric acid and heating to a temperature of 97–100° C. While maintaining the temperature, 0.75 mole of formaldehyde as a 37% aqueous solution is slowly added over a period of 30–60 minutes. Using heat and vacuum the reaction product then is dehydrated until a temperature of 120–130° C. is reached at 27–28 inches of vacuum. The resin product is then cooled and ground with 14–18 parts by weight of hexamethylene tetramine per 100 parts by weight of resin with the resulting ground mixture being typical of the two-stage molding resin useful in the composition of this invention.

The urea resin which is combined with the above-described alkali-extracted bark fiber product broadly comprises a thermosetting resinous condensation product of urea, guanidine, or thiourea and an aldehyde such as formaldehyde, acetaldehyde, furfural and the like. The urea-formaldehyde resins customarily used as constituents of molding compositions, and available as a wide variety of commercial preparations, are particularly well suited for the present purpose.

The melamine formaldehyde resins customarily used as constituents of molding compositions are also particularly well suited for the present purpose. These broadly comprise thermosetting resinous condensation products of melamine or aminotriazines and an aldehyde such as formaldehyde, acetaldehyde, furfural and the like.

The relative proportions of bark fiber and resin to be included in the hereindescribed composition are somewhat variable depending upon the flow qualities (stiff flow, soft flow, etc.) desired in the uncured compound, and the properties desired in the molded product and will depend particularly on the point at which the bark fiber is added to the resin.

It has been found that the bark fiber may be added to the resin not only prior to the compounding of the resin into a molding composition as is normal with most fillers, but also may be added to the molding composition itself after it has been compounded and prior to molding. The latter mixture appears to be unique because the usual fillers, such as wood flour, asbestos or cotton flock, do not mix uniformly with the molding compound and, therefore, do not act as an extender. The bark fiber does mix uniformly with the compound and acts as an extender that improves the impact strength of the molded product.

In general, the amount of bark fiber added to the resin prior to compounding will be 30–70%, preferably from 40–60%, by weight, dry solids basis, of the total weight of the composition to be compounded. Other components may be included in this formulation as desirable or necessary. Thus it is usually desirable to include a small proportion of mold release compounds such as stearic acid or zinc stearate. It also may be desirable to add a small proportion of an accelerator such as lime. Still further, various pigments, dyes and plasticizers may be included as desired.

These compositions lend themselves to formulation and molding using conventional procedures and equipment. In general, in the preparation of the phenol-aldehyde resin compound the ingredients are premixed, rolled hot on differential rolls, sheeted, cooled, ground and separated to a suitable particle size which may be from −8 mesh to +65 mesh. In the preparation of the urea-aldehyde or melamine-aldehyde resin compounds the liquid aqueous resin and the other ingredients are mixed in a high density mixer, dehydrated under vacuum, and granulated to a suitable particle size which may also be from −8 mesh to +65 mesh. After compounding, the resulting particulate compositions may be molded into various shapes, using conventional molds, molding conditions and techniques of operation.

As stated previously, the bark fiber may also be added to a molding compound after it has been compounded in a process similar to that described in the previous paragraph and prior to molding. In general, the amount of bark fiber which is added to a molding compound is from 1–40%, preferably from 15–30%, by weight, dry solids basis, of the total weight of the composition after the bark fiber is added. Other components, already included in the compound, will be present in the composition. These will include fillers such as wood flour, cotton flock, kraft flock, asbestos, etc., mold release compounds, accelerators, pigments, dyes and plasticizers. Any suitable light duty mixer such as a simple tumbler or a ribbon blender may be used to mix the fiber and compound.

After mixing the bark fiber with the molding compound, the resulting composition may be molded into various shapes using conventional molds, molding conditions and techniques of operation.

These molding compositions, including "alkali-extracted bark fiber" as a filler component have significantly improved properties. Thus, they have a relatively high bulk density of the order of 60 gr./100 cc. as opposed to a bulk density of but about 35 gr./100 cc. possessed by medium impact molding compounds containing cotton flock or other conventional long fiber fillers. As a consequence, the compositions of the invention are handled easily and feed freely in molding machines, and the flash release is without difficulty.

Within the molds the compound flows readily, such that one containing 65% by weight of the herein described alkali-extracted Douglas fir bark fiber may have the same flow qualities as a conventional composition containing 50% by weight wood flour filler. As a direct consequence, it is possible to employ larger quantities of the "alkali-extracted fiber" filler in the compositions with major savings in resin costs. In addition, the compositions of this invention due to the low percentage of alkali soluble material in the filler are nonstaining and demonstrate good mold release properties.

These advantageous results are obtained without sacrifice in strength properties of the molded products. The impact strength of the molded products is actually increased over that associated with conventional general purpose molding compounds and brought into the range heretofore characteristic only of the medium impact molding compounds containing long fibered fillers. Furthermore, this is accomplished without the attendant loss in surface quality and flash release generally associated with medium impact molding compounds.

The foregoing procedures and properties of the herein described molding compositions are further illustrated in the following examples:

*Example I*

This example illustrates a typical procedure for preparing the alkali-extracted bark fiber filler used in the molding compounds of the invention.

Douglas fir bark was reduced to particles in a hammer mill having a ³⁄₁₆-inch screen. The ground bark was treated in a continuous countercurrent two-stage extraction system with the bark fed into the first stage and an aqueous caustic soda solution having a concentration of 50% by weight fed together with countercurrent wash liquor into the second stage. The temperature maintained in the extraction system was about 200° F. The pH values were 10 in the first stage and 13 in the second stage, while the consistencies were 8% and 7% respectively, and the dwell times were 60 minutes in each stage.

A caustic soda extract product of the bark was produced continuously from the first stage, and a treated extracted bark fiber product was produced continuously from the second stage. The bark fiber product was passed over a vibrating screen separator onto a washing horizontal vacuum pan filter and then through a roll press. The press product then was dried in a rotary drum dryer, heated to 450° F. at the inlet.

The extracted bark fiber was suitable per se for use in the resinous molding compositions of the invention. However, as mentioned previously, where desirable, subsequent screening may be used to insure complete removal of any wood splinters or dust particles. In the subsequent examples this bark fiber product is referred to as "alkali-extracted bark fiber."

Example II

This example illustrates a typical molding composition using a conventional alkaline condensed one-stage phenol formaldehyde thermosetting molding resin and the "alkali-extracted bark fiber" of Example I, and in which the fiber is added prior to compounding. The "alkali-extracted bark fiber" had an average alkali soluble content of 13%, and a moisture content of 2%. The formulation employed was as follows:

| | Parts by weight |
|---|---|
| Resin | 1,000 |
| "Alkali-extracted bark fiber" | 1,000 |
| Lime (accelerator) | 30 |
| Stearic acid (mold release) | 30 |

The above ingredients were premixed dry for 15 minutes, hot-rolled on differential rolls, sheeted, removed from the rolls and cooled, ground and screened. A −8 +65 mesh fraction was used for molding discs of 4-in. diameter and ⅛-in. thickness using a pressure of 1,000 p.s.i. and a temperature of 165° C. for three minutes.

Example III

Using the same formulation and procedures of Example II, a molding compound was prepared substituting a two-stage phenolic thermosetting molding resin for the one-stage resin of Example II.

Discs, 4 inches in diameter and ⅛ inch thick, were prepared as described in Example II.

Example IV

The properties of the molding compounds and of the molded products of Examples II and III were compared with those of three similar compositions used as controls. The one was a general purpose molding compound having wood flour as a filler rather than the "alkali-extracted bark fiber." The second was also a general purpose molding compound having Douglas fir bark fiber which had been processed from whole bark by series of mechanical steps of grinding and screening as mentioned previously herein. The third was a conventional medium impact molding compound containing cotton flock as the filler.

The comparative results are given below:

| Characteristics | General Purpose (Wood Flour) | General Purpose (Mechanical Bark Fiber) | Medium Impact (Cotton Flock) | Examples II and III |
|---|---|---|---|---|
| Bulk Density | Good | Good | Poor | Good. |
| Appearance | do | Poor (Stained). | do | Do. |
| Impact | Low | Low | Medium | Medium. |
| Hopper Feeding | Good | Good | Poor | Good. |
| Moldability | do | do | do | Do. |

Example V

This example illustrates a molding composition using a conventional two-stage phenol formaldehyde thermosetting molding compound and the "alkali-extracted bark fiber" of Example I. The molding compound has approximately 50% filler of which a major portion is wood flour. The bark fiber is added to the particulate molding compound after the compounding and prior to molding.

The material was preheated in an oven for about thirty minutes at 158° F. 260 gr. of the material was then placed in a 6″ x 12″ step panel die mounted in a 145-ton capacity press with a maximum available mold presure of 4,000 p.s.i. The step panel is ¼″ thick for 3⅝ inches of its length and ⅛″ thick for the remainder. The panels were pressed for 3½ minutes at about 320° F. with a breathe 15–20 seconds after full pressure was reached.

Several test specimens were cut from the panels. One-half inch wide Izod impact specimens were cut from the ¼″-thick end of the panel. Other specimens were cut for flexural strength, water-absorbency and tensile strength.

The Izod impact test was performed in accordance with the ASTM standards D256–56. Briefly, the specimen is notched and placed in a holder and a fixed pendulum swings down and breaks the sample. The value of the energy expended in breaking the specimen expressed in ft.-lbs./in. of notch is recorded.

Samples were also tested in a dropped ball impact tester. For this purpose, 36 gr. of the mixture were placed in a 4-inch disc die in an 8-ton press having a maximum pressure of 1,200 p.s.i. The discs were pressed to ⅛″ thickness for 2¼ minutes at 320° F. with a breathe 15–20 seconds after full pressure was reached. The disc was placed in the dropped ball impact tester and the center of the disc was struck with a ½-pound weight. The weight was raised in 1-inch increments, and the point at which the specimen cracked was recorded. The following table shows the Izod impact and dropped ball impact results for mixtures incorporating from 0 to 30% of bark fiber:

| Molding Compound, Percent of Total Composition by Weight | Bark Fiber, Percent of Total Composition by Weight | Izod Impact, ft. lbs./in. | Percent Increase Izod | Dropped Ball Impact, ½ lb. in. | Percent Increase Dropped Ball Impact |
|---|---|---|---|---|---|
| 100 |  | 0.27 |  | 8 |  |
| 95 | 5 | 0.30 | 11.1 | 9 | 12.5 |
| 90 | 10 | 0.32 | 18.5 | 10 | 25 |
| 85 | 15 | 0.37 | 37 | 11 | 37.5 |
| 80 | 20 | 0.40 | 47 | 13 | 62.5 |
| 75 | 25 | 0.51 | 89 | 16 | 100 |
| 70 | 30 |  |  | 18 | 125 |

Example VI

A molding compound comprising approximately 50% phenol formaldehyde resin and 50% filler which had as a major constituent wood flour was mixed with the bark fiber of Example I, molded and tested as described in Example V. The one difference was that the mixture containing 30% bark fiber was not preheated prior to molding. The results are shown in the following table:

| Molding Compound, Percent of Total Composition by Weight | Bark Fiber, Percent of Total Composition by Weight | Izod Impact, ft. lbs./in. | Percent Increase Izod | Dropped Ball Impact, ½ lb. in. | Percent Increase Dropped Ball Impact |
|---|---|---|---|---|---|
| 100 | --- | 0.29 | --- | 8.4 | --- |
| 90 | 10 | 0.33 | 13.8 | --- | --- |
| 80 | 20 | 0.36 | 24.2 | 13.6 | 61.8 |
| 70 | 30 | 0.41 | 41.4 | 14 | 66.6 |

Example VII

A molding compound comprising approximately 50% phenol formaldehyde resin and 50% filler which had as major constituents asbestos and wood flour was mixed with the bark fiber of Example I, molded and tested as described in Example V. The results are shown in the following table:

| Molding Compound, Percent of Total Composition by Weight | Bark Fiber, Percent of Total Composition by Weight | Izod Impact, ft. lbs./in. | Percent Increase Izod | Dropped Ball Impact, ½ lb. in. | Percent Increase Dropped Ball Impact |
|---|---|---|---|---|---|
| 100 | --- | 0.29 | --- | 7 | --- |
| 80 | 20 | 0.42 | 45 | 10 | 43 |

Example VIII

A molding compound comprising approximately 50% phenol formaldehyde resin and approximately 50% filler, of which the major constituent was cotton flock, was mixed with the bark fiber of Example I, molded and tested as described in Example V. The results are shown in the following table:

| Molding Compound, Percent of Total Composition by Weight | Bark Fiber, Percent of Total Composition by Weight | Izod Impact, ft. lbs./in. | Percent Increase Izod | Dropped Ball Impact, ½ lb. in. | Percent Increase Dropped Ball Impact |
|---|---|---|---|---|---|
| 100 | --- | 0.34 | --- | 10 | --- |
| 80 | 20 | 0.47 | 38 | 14 | 40 |

Example IX

The bark fiber of Example I was neutralized in a sulphuric acid bath. The fiber had a pH of from 4.5 to 6 when wet and from 6 to 7 when dried. This fiber was then mixed with a molding compound comprising approximately 50% urea-formaldehyde resin and 50% filler of which the major constituent was wood flour, and was molded and tested in the manner described in Example V. The results are shown in the following table:

| Molding Compound, Percent of Total Composition by Weight | Bark Fiber, Percent of Total Composition by Weight | Izod Impact, ft. lbs./in. | Percent Increase Izod |
|---|---|---|---|
| 100 | --- | 0.26 | --- |
| 80 | 20 | 0.36 | 38.5 |

Example X

A molding compound comprising approximately 50% melamine formaldehyde resin and 50% filler, of which the major constituent was wood flour, was mixed with bark fiber of Example IX, molded and tested as described in Example V. The results are shown in the following table:

| Molding Compound, Percent of Total Composition by Weight | Bark Fiber, Percent of Total Composition by Weight | Izod Impact, ft. lbs./in. | Percent Increase Izod |
|---|---|---|---|
| 100 | --- | 0.26 | --- |
| 80 | 20 | 0.39 | 50 |

As can be seen from the previous examples, there is an unquestionable increase in impact strength by the inclusion of the bark fiber. At a 20–25% usage of the bark fiber with a prepared molding compound, the Izod impact is typically increased by one-third and the dropped ball impact by one-half. Although there is a slight reduction in flexural and tensile strengths as the percentage of bark fiber was increased, the modulus of elasticity was unaffected and the Rockwell hardness and specific gravity were virtually unchanged.

Having thus described our invention and preferred embodiments, we claim as new and desire to protect by Letters Patent:

We claim:
1. In the process of making a particulate thermosetting molding composition comprising,
   compounding a mixture of a resin selected from the group consisting of phenol-aldehydes, urea-aldehydes, and melamine-aldehydes with a filler selected from the group consisting of wood flour, nut shell flour, cotton flock, paper flock, sisal fiber, asbestos or mixtures thereof; and
   grinding said compounded mixture;

the improvement comprising subsequently adding to said ground composition and mixing therewith from 1–40% by weight, dry solids basis, of the total weight of the composition an alkali extracted Douglas fir bark fiber having an alkali soluble content of less than 20%.

2. The process of claim 1 in which said bark fiber comprises 15–30% by weight, dry solids basis of the total weight of the composition.

3. The process of claim 1 in which the bark fiber has a pH of less than 7.

References Cited

UNITED STATES PATENTS

| | | | |
|---|---|---|---|
| 1,863,540 | 6/1932 | Hurst | 260—17.2 |
| 2,571,986 | 10/1951 | Hallonguist | 260—17.2 |
| 2,697,081 | 12/1954 | Heritage | 260—17.2 |
| 2,890,231 | 6/1959 | Heritage et al. | 260—412.5 |

WILLIAM H. SHORT, *Primary Examiner.*

E. M. WOODBERRY, *Assistant Examiner.*